Dec. 30, 1969   E. BECKER ETAL   3,487,438
CLUTCH AND BRAKE ARRANGEMENTS FOR A MOTOR
Filed May 3, 1968   4 Sheets-Sheet 1

INVENTORS:
ERNST BECKER
KARL NOTZ

By: Michael S. Striker
Attorney

INVENTORS:
ERNST BECKER
KARL NOTZ

By: Michael S. Striker
Attorney

FIG.5a
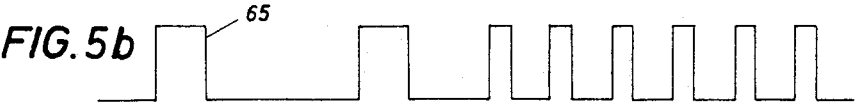
FIG.5b
FIG.5c
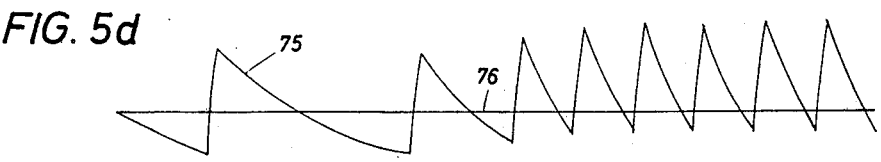
FIG.5d
FIG.5e
FIG.5

United States Patent Office 3,487,438
Patented Dec. 30, 1969

3,487,438
CLUTCH AND BRAKE ARRANGEMENTS
FOR A MOTOR
Ernst Becker and Karl Notz, Darmstadt, Germany, assignors to Quick-Rotan Becker & Co., Darmstadt, Germany
Filed May 3, 1968, Ser. No. 726,441
Claims priority, application Germany, May 6, 1967, Q 942
Int. Cl. F16d 11/06, 13/22, 23/10
U.S. Cl. 192—18                                   24 Claims

ABSTRACT OF THE DISCLOSURE

Two coupling members are mounted for axial movement on an output shaft between a stationary brake member and a clutch member which is rotated by a motor shaft. In the space between the clutch member and the brake member, an annular carrier supporting a coupling winding and a brake winding is mounted in a position surrounding the two coupling members. By selective energization of the coupling winding or of the brake winding, one coupling member is moved to a coupling position frictionally engaging the clutch member, while the other coupling member can be moved by the brake winding to a braking position frictionally engaging the stationary brake member. An electronic circuit may control the energization of the coupling winding and of the brake winding to compensate for speed variations of the motor shaft whereby a substantially constant speed of the output shaft is maintained. Auxiliary means for rotating and stopping the brake member may be provided.

BACKGROUND OF THE INVENTION

Clutch and brake arrangements for a motor are known which serve the purpose of rapidly stopping an output shaft which is normally driven through a clutch by a motor shaft. In accordance with the prior art, as represented by the U.S. Patent 3,174,450, a coupling disc is shifted between a coupling and a brake position by a foot pedal. The operation is slow, and very tiring for the operator.

In accordance with the prior art as represented by the U.S. Patent 3,227,253, the coupling plate is operated by an electromagnetic means whose armature moves coaxial with the output shaft and is returned by a spring after electromagnetic actuation. This construction has the disadvantage that a very strong electromagnetic means is required since not only the coupling pressure, but also the force of the spring has to be overcome. Consequently, the shifting operation is comparatively slow.

It has also been proposed to return the coupling plate to the normal brake position by another electromagnetic means, but the available space is insufficient, or the dimensions of the apparatus have to be increased in an undesirable manner.

Since a great amount of space in axial direction is required for the electromagnetic operating means according to the prior art, auxiliary devices, for example, for rotating the brake member, cannot be provided. Another disadvantage of the known construction is that the magnetic flux passes through an air gap which is located in a radial plane in relation to the axis of the output shaft so that the width of the air gap varies in accordance with the wear of the lining of the coupling plate. Consequently, the magnetic force depends on the degree of wear of the lining.

SUMMARY OF THE INVENTION

It is the object of the invention to overcome the disadvantages of known clutch and brake arrangements for motors, and to provide a clutch and brake arrangement with an electromagnetic operating means of extremely short axial length and arranged in a position in which the axial length of the clutch and brake arrangement is not substantially increased.

Another object of the invention is to provide an electromagnetically operated clutch and brake arrangement whose dimensions do not exceed the dimension of a conventional mechanically operated clutch and brake arrangement.

Another object of the invention is to provide an electromagnetically operated clutch and brake arrangement in which the air gaps are independent of the degree of wear of the linings.

Another object of the invention is to provide an electromagnetically operated clutch and brake arrangement which rapidly responds to electric energizing pulses.

Another object of the invention is to provide a clutch and brake arrangement with an electromagnetic operating means which is energizable for shifting a coupling means between a coupling position for driving an output shaft, and a braking position for stopping the output shaft.

One embodiment of the invention comprises an annular carrier in which two annular, alternately energizable, axially adjacent windings are supported. The annular carrier surrounds a coupling means and forms a small cylindrical air gap with an annular peripheral magnetizable portion of the same. Magnetizable peripheral portions of a clutch member, driven by a motor shaft, and of a brake member are located on opposite sides of the carrier and of the winding. Consequently a magnetic flux can flow through the carrier, the peripheral portion of the coupling means and either through the clutch member or the brake member.

Since the outer peripheral portion of the coupling means, which preferably includes two coupling members respectively cooperating with the clutch member and the brake member, are used as part of the armature, and further due to the fact that the windings surround the coupling means or coupling members, the axial length of the apparatus is a minimum, and no additional axial space is required for the carrier and windings. This has the advantage that the general construction of the apparatus conforms to a mechanically operated clutch and brake arrangement so that parts of the same can be used in the manufacture of the apparatus of the invention.

No return spring, and no independent return magnet is provided so that the electromagnetic operating means, namely the carrier and the windings, has to produce only the force required for pressing the coupling means or coupling members against the clutch member or brake member.

Since the carrier of the winding can be placed between the motor housing and a closure portion of the housing, cooling of the carrier can be easily effected by peripheral cooling fins.

As mentioned above, in the preferred embodiment of the invention, two coupling members are provided which are mounted on the output shaft for axial movement, but are connected for rotation with the same. One of the coupling members is operated by a coupling winding on the carrier to move into engagement with a clutch plate driven by the motor shaft, while the other coupling member is actuated by the brake winding on the carrier to move into engagement with a brake member which is either supported on a housing part and stationary, or driven by an auxiliary drive at a lower rotary speed than the rotary speed of the motor shaft and clutch plate until stopped by an auxiliary brake arrangement.

Due to the division of the coupling means into two coupling members which are individually movable, the masses moved by electromagnetic operating means are reduced so that the apparatus rapidly responds to an energizing pulse.

In accordance with the preferred embodiment of the invention, the coupling members have parts in contact with the clutch member and brake member, respectively when the linings of the coupling members engage the same. In this manner, not only air gaps are avoided, but the linings and adjacent parts of the coupling members are worn off at the same rate. Due to the avoiding of air gaps, the magnetic losses are a minimum, and a correspondingly small amount of electric power is required. The wear of the linings cannot produce a greater or smaller air gap between the coupling members and the clutch member and brake member, respectively.

The coupling means or the coupling members may consist entirely of a magnetizable material, but it is advantageous to make the coupling members of a synthetic material or a light metal, and to make only the annular peripheral portions of the coupling members, through which the flux flows, magnetizable. The light weight coupling members respond quickly to the magnetic force due to their low mass and inertia.

In the preferred embodiment, a peripheral outer portion of the carrier surrounds the circular clutch member and the circular brake member, while an inner circular peripheral portion surrounds the outer peripheral portions of the coupling members. Due to this construction, circular air gaps are obtained which are coaxial with the motor and output shafts and are not influenced in any manner by the wear of the linings of the coupling members. The construction has also the advantage that cylindrical air gaps can be more accurately machined than air gaps located in planes perpendicular to the axis of rotation. Precise narrow air gaps can be produced without difficulty, which results in high magnetic forces produced by a comparatively small electromagnet. Due to the great radial distance between the air gaps formed by the carrier and the axis, large surfaces bound the air gaps so that the magnetic resistance is low even if the axial dimension of the circular air gaps is small.

In a modified embodiment of the invention, an auxiliary drive is provided for the brake member. A first transmission connects the motor shaft with an auxiliary clutch member which forms with an auxiliary coupling member a clutch for rotating the brake member through a second transmission. The second transmission is a reduction transmission and has a speed reducing ratio which is greater than the transmission ratio of the first transmission. The auxiliary coupling means can be moved to a position in which it is braked, and the braking force is transmitted by the second transmission to the brake member for stopping the same. Due to the high reduction ratio of the second ratio, the unavoidable rotation of the auxiliary coupling after braking is transmitted only at a greatly reduced ratio to the output shaft.

The first and second auxiliary transmissions are preferably pulley and belt transmissions, but chain wheel transmissions or gear transmissions may be used. In any event, it is advantageous to make the motor driven transmission part integral with the clutch member.

Preferably, an electronic control circuit is provided by which the coupling winding and brake winding are selectively energized to compensate speed variations of the motor shaft so that the output shaft rotates at a substantially constant speed between narrow limits. A desired speed can be selected by setting the control circuit accordingly so that the brake winding is energized when the speed of the output shaft exceeds the desired speed, and the coupling winding is energized when the speed of the output shaft drops below a predetermined speed so that the output shaft is again coupled to the motor shaft and driven by the same.

In a preferred embodiment of the control circuit, an impulse generator is driven by the output shaft, or by a drive shaft driven by the same, and produces a sequence of pulses whose frequency represents the actual rotary speed of the output shaft. The pulses are used for charging a RC-network including a capacitor whose discharge time is adjusted in accordance with a desired speed by setting a variable resistor. Schmitt triggers receive the signals from the RC-network and alternately respond to energize the coupling winding depending on the charge condition of the capacitor of the RC-network.

The output shaft, or a drive shaft driven from the same can be stopped in a precisely determined angular position. For this purpose, a pulse generator is operated by the output shaft or by the drive shaft driven by the same, and produces signals supplied to the brake winding for rendering the brake member effective in a predetermined angular position of the drive shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 includes FIGS. 5a to 5e which are diagrams illustrating the pulses at different points of the control circuit of FIG. 4.

DESCRIPTION OF THE PREFERRED
EMBODIMENTS

Figure 1:
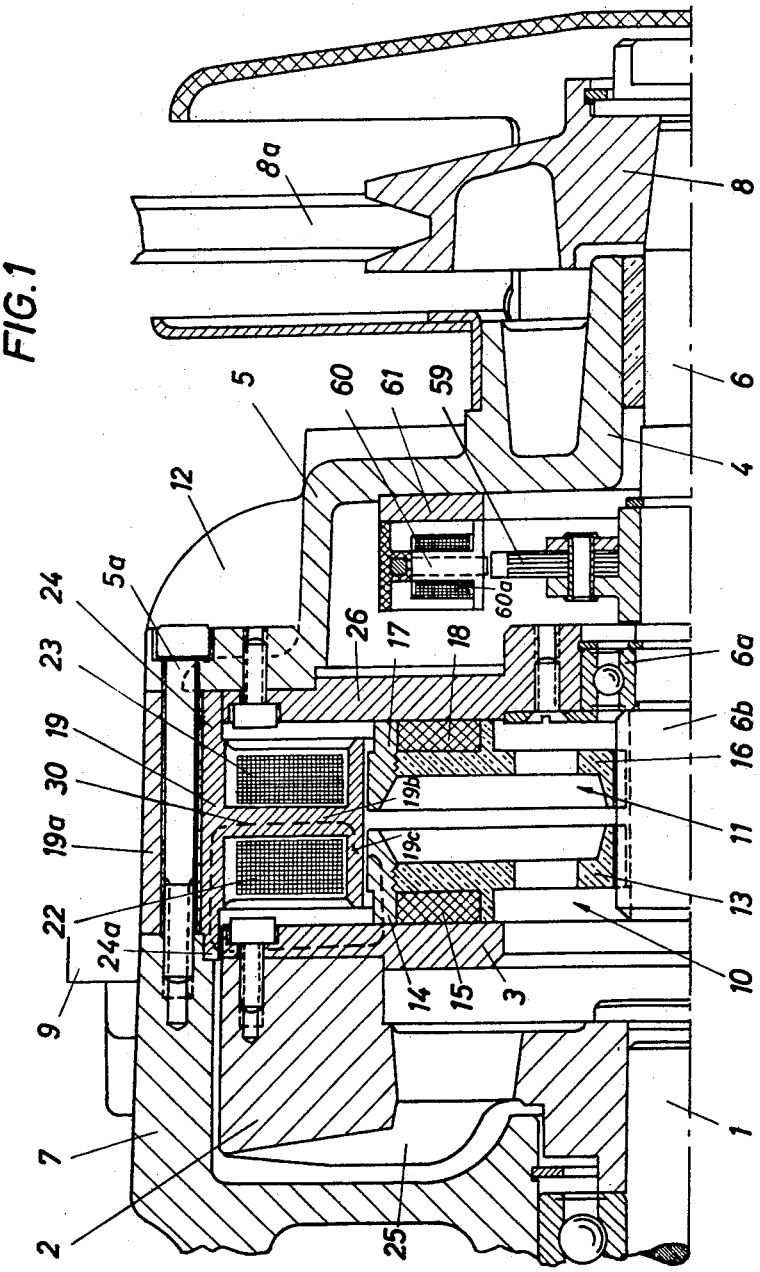
FIG. 1 is a fragmentary axial sectional view illustrating a first embodiment of the invention.

A motor shaft 1 is mounted in bearings of a motor housing 7, and is driven by a motor, not shown in FIG. 1. A flywheel 2 is fixedly secured to motor shaft 1, and carries a clutch member 3 in the form of an annular clutch disc secured by screws to flywheel 2, which may consist of an aluminum alloy. A closure cap 5 is secured to the motor housing 7 by bolts 5a screwed into threaded bores of motor housing 7, and passing through bores of an annular peripheral portion 19a of a carrier means 19 which has a web portion 19b, and an inner annular portion 19c, and supports two annular windings 22 and 23 which can be selectively energized. A brake member in the form of an annular disc 26 is secured by screws to the housing portion 5, and consists of a magnetizable material.

An output shaft 6 is mounted in a bearing 6a and in a tubular portion 4 of housing portion 5 in a position coaxial with the motor shaft 1. A portion 6b of output shaft 6 passes through the stationary brake member 26 and is located between the same and the clutch member 3. The end portion of output shaft 6 carries a pully 8 driving a belt 8a which passes over another pulley, not shown, connected with a drive shaft, not shown, by which a machine is driven when output shaft 6 is driven by motor shaft 1. The output shaft portion 6b is splined, or has key grooves, so that the hubs 13 and 16 of a pair of coupling members 10 and 11 are mounted on output shaft portion 6b for independent axial movement, but rotate with the same.

Coupling members 10 and 11 preferably consist of a synthetic material, with the exception of two annular peripheral magnetizable portions 14 and 17. Annular linings 15 and 18 are mounted in corresponding annular grooves of coupling members 10 and 11, and respectively cooperate with the magnetizable clutch member 3, and the stationary magnetizable brake member 26. Cooling fins 9 are secured to the outer peripheral portion of annular carrier 19, and housing closure portion 5 has cooling fins 12.

The axial length of the outer peripheral portion 19a of carrier 19 is selected so that the annular end portion 24 abuts the cylindrical outer peripheral face of brake member 26, while the annular end portion 24a surrounds the cylindrical peripheral face of clutch member 3 spaced from the same by a small circular air gap in order not to interfere with the rotation of clutch member 3.

When winding 22 is energized, a magnetic flux is generated, which is schematically illustrated by a broken line 30. The flux flows through the left halves of carrier portions 19a and 19c, through the web portion 19b, through the magnetizable peripheral portion 14 of coupling member 10, and through the outer peripheral annular magnetizable portion of clutch member 3. Consequently, a magnetic force urges coupling member 10 in axial direction to the left as viewed in FIG. 1 so that the lining 15 is pressed against the surface of clutch member 3 and is coupled with the same so that motor shaft 1 and clutch member 3 rotate output shaft 6 through coupling member 10.

When winding 23 is energized, a corresponding opposite magnetic flux is generated which flows through magnetizable carrier portions 19a, 19b, 19c, through the peripheral magnetizable portion 17 of coupling member 11, and through a peripheral magnetizable portion of brake member 26 so as to exert a magnetic force on coupling member 11 which moves to the right as viewed in FIG. 1 whereby lining 18 is pressed against the surface of brake member 26 so that coupling member 11 is braked together with output shaft 6b which is quickly stopped together with the drive shaft, not shown, to which shaft 6 is connected by the pulley and belt means 8, 8a.

The clutch and brake arrangement shown in FIG. 1 can be constructed to the same dimensions as standard mechanically operated clutch and brake arrangements. The ampere windings of the coils 22 and 23 are small, and the time for shifting one of the coupling members 10, 11 is minimal.

Flywheel 2 carries cooling fins 25 and has openings therethrough so that clutch member 3 is efficiently cooled by air flowing into and out of the interior of housing means 5, 7 through openings, not shown in FIG. 1. The heat produced in brake member 26 directly flows through housing portion 5 into cooling fins 12 which dissipate the heat. The heat produced by windings 22 and 23 is dissipated by cooling fins 9, and carrier 19 is also cooled by the draft produced by the rotating cooling fins 25.

Coupling members 10 and 11 together constitute coupling means movable between a coupling position engaging clutch member 3 and a braking position engaging brake member 26. The outer peripheral portions 14, 17 of the coupling means 10, 11 is magnetizable and surrounded by electromagnetic operating means 22, 23, 19 by which the coupling means are shifted between the coupling and braking positions.

Figure 2:
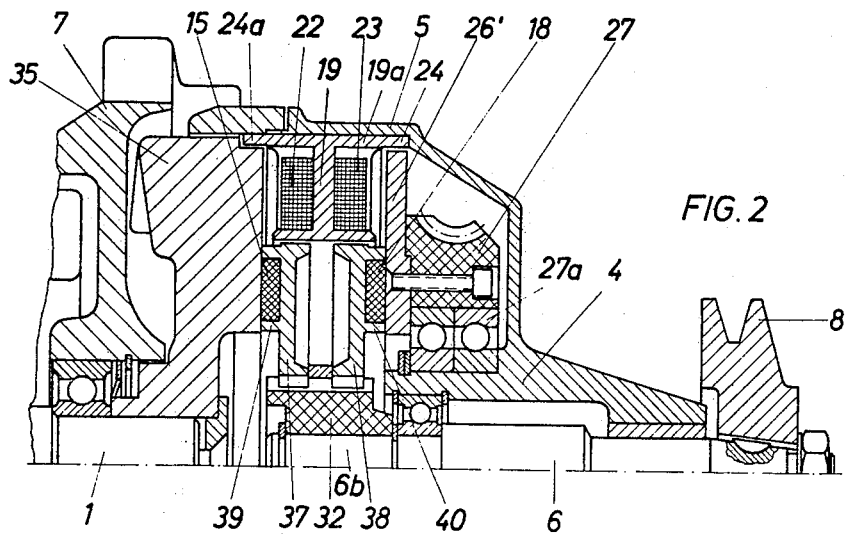
FIG. 2 is a fragmentary axial sectional view illustrating a second embodiment of the invention.

In FIG. 2, parts corresponding to parts in FIG. 1 are indicated by the same reference numerals. A motor shaft 1 is mounted in motor housing 7 and carries a clutch member 35 which combines the flywheel 2 with the clutch disc 3 of the embodiment of FIG. 1, and consists of a magnetizable material. A carrier 19 having inner and outer peripheral portions and a web mounts a pair of annular windings 22, 23. Clutch member 35 has a peripheral recess into which the annular end portion 24a of carrier portion 19a projects. The annular end portion 24 surrounds a brake member 26' which is secured by screws to a worm wheel 27 which is mounted on a bearing 27a surrounding a portion of hub 4 in which output shaft 6 is mounted for rotation.

A worm screw, not shown, cooperates with worm wheel 27 to turn brake member 26', and is driven through an auxiliary clutch from the same motor which drives motor shaft 1 in a manner disclosed in the U.S. Patent 3,174,450.

Coupling members 37 and 38 consist of a magnetizable material, and include annular portions 39, 40 which are in contact with the magnetizable clutch member 35 and magnetizable brake member 26', respectively, when actuated by windings 22 and 23, respectively. Consequently, the magnetic flux generated by each of windings 22 and 23 passes not only through the peripheral portions of coupling members 37 and 38, but also through the annular portions 39 and 40 whereby the magnetic fluxes are strengthened.

The output shaft portion 6b carries a fixed sleeve 32 consisting of a synthetic material and having splines or key grooves for mounting coupling members 37, 38 for independent axial movement, but connected with shaft 6 for rotation.

When one of the windings 22 or 23 is energized, the respective associated coupling member 37 or 38 is actuated to move in axial direction to a position frictionally engaging clutch member 35 or brake member 26'. When worm wheel 27 is not driven, brake member 26' is stationary since rotation of worm wheel 27 is blocked by the worm screw.

As in the embodiment of FIG. 1, the annular carrier 19 may be cast of a magnetizable material, or machined on a lathe. Carrier 19 is secured to a surrounding portion of closure part 5 of the motor housing 7.

Figure 3:
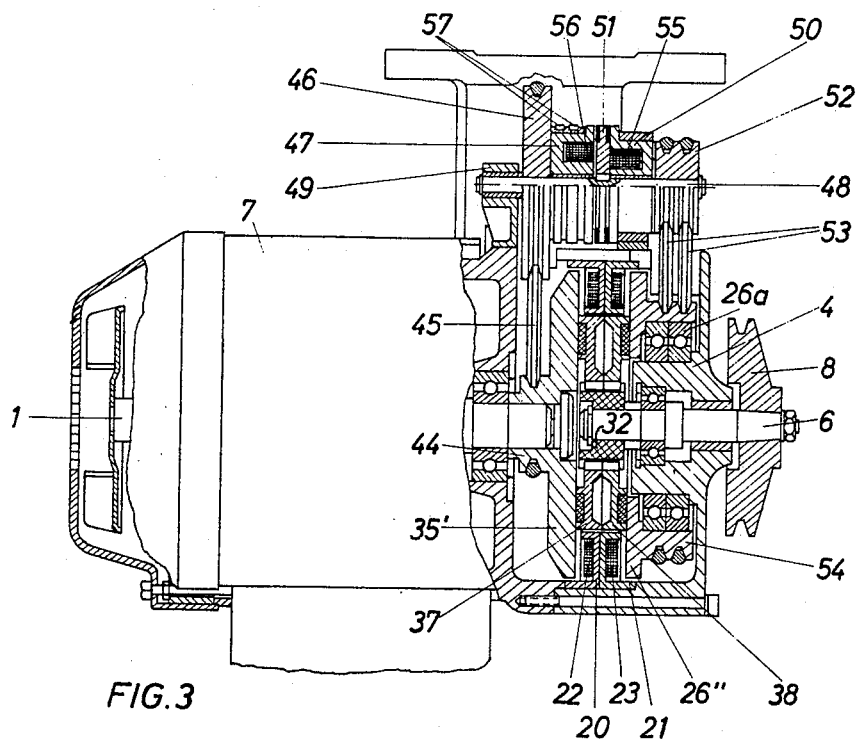
FIG. 3 is a fragmentary side view, partially in axial section, illustrating a third embodiment of the invention.

The embodiment of FIG. 3 operates on the same principle as the embodiments of FIGS. 1 and 2, with the exception that the brake member 26'' is driven and rotated by an auxiliary drive deriving power from motor shaft 1. While in the embodiment of FIG. 2, the axial depth of the closure part 5 of the housing has to be increased for providing space for the worm gear drive of brake member 26', the axial length of the clutch and brake arrangement shown in FIG. 3 is not increased as compared with the embodiment of FIG. 1, since the auxiliary drive can be mounted adjacent or above the clutch and brake arrangement.

The clutch member 35' is driven by shaft 1 of a motor located in housing 7, and consists of a magnetizable material. Between clutch member 35' and brake member 26'', coupling members 37 and 38 are located which are mounted on output shaft 6 and a sleeve 32, as described with reference to FIG. 2.

Clutch member 35' has an integral pulley 44 connected by a belt 45 to a pulley 46 which is fixedly connected with an annular electromagnetic means 47. Members 46, 47 are rotatably mounted on an auxiliary shaft 48 which is mounted for rotation in a bearing means 49 supported on motor housing 7, and in a bearing provided in a stationary annular second electromagnetic means 55. An auxiliary coupling member 51 is mounted on shaft 48 for axial movement, but is connected for rotation with shaft 48. Another pulley 52 is secured to shaft 48 and rotates with the same. Belts 53 connect pulley 52 with an integral pulley portion 54 of brake member 26''. When windings 56 and 55 of the electromagnetic means 47 and 50 are respectively energized, coupling member 51 is shifted between a position coupled with members 47, 46, and another position abutting the stationary brake member 50. Slide rings 57 supply current to winding 56 which rotates with member 47.

In the normal position of rest, winding 23 of the main clutch and brake arrangement, and winding 55 of the auxiliary clutch and brake device are energized. Main coupling member 38 abuts main brake member 26'', which cannot rotate about bearings 26a since pulley 52 is blocked together with shaft 48 and coupling member 51 which abuts the stationary brake member 50.

If instead of windings 23, 55, winding 22 of the main clutch and brake arrangement, and winding 56 of the auxiliary clutch and brake arrangement are energized, motor shaft 1 drives clutch member 35′, coupling member 37, and output shaft 6, while at the same time a drive torque is transmitted from pulley 44 to pulley 46, electromagnetic means 47, coupling member 51 which abuts electromagnetic means 47, shaft 48, and pulley 52 to the pulley portion 54 of brake member 26″ so that the same rotates at a lower speed than motor shaft 1 and output shaft 6. Since winding 23 is not energized, the rotation of brake member 26″ has no influence on coupling member 38.

If instead of winding 22, winding 23 is now energized, output shaft 6 is disconnected from clutch member 35′, and coupled with the slowly rotating brake member 26″, so that output shaft 6 is braked to the lower rotary speed of brake member 26″.

To stop output shaft 6, winding 56 is de-energized, and winding 55 is energized so that coupling member 51 is pressed against the stationary auxiliary brake member 50, and stops together with shaft 48 and pulley 52 on the same, whereby pulley portion 54 and brake member 26″ are stopped, so that coupling member 38 with output shaft 6 also stop.

If it is necessary to stop the drive shaft, not shown, which is driven from pulley 8 on output shaft 6, precisely in a predetermined angular position, windings 55 and 56 are advantageously energized by circuit means as shown in FIGS. 1a, 2a and 3a of U.S. Patent 3,174,450.

In the embodiment of FIG. 3, the carrier 20 is constructed of two pressed rings of U-shaped cross section which are secured to each other.

A clutch and brake arrangement according to the invention has an extremely short actuating time, and is consequently particularly suited for an automatic control of the rotary speed of the output shaft 6, and of the machine drive shaft, not shown, driven by the same. This can be accomplished by comparing the actual rotary speed of shaft 6 with a desired rotary speed. Depending on the magnitude and direction of a deviation of the actual rotary speed from a predetermined desired speed, either coupling winding 22 or brake winding 23 is energized. A circuit in which the actual rotary speed of output shaft 6 is represented by a signal which is compared with another signal representing the predetermined desired speed can be provided for controlling the energization of the windings 22 and 23 dependent on the magnitude and the positive or negative direction of the deviation of the signal representing the actual rotary speed of output shaft 6, and the signal representing the desired speed.

A preferred embodiment of a control circuit according to the invention serving the purpose of maintaining a predetermined desired speed of the output shaft 6 in the embodiment of FIG. 1, will now be explained with reference to FIGS. 4 and 5.

As shown in FIG. 1, a gear 59 stamped out of superimposed laminated magnetizable sheets secured to each other, is secured to shaft 6 for rotation, and has, for example, 60 peripheral projections which, during rotation of shaft 6, pass a magnetic head 60 secured by a bracket 61 to housing portion 5 and having a winding 60a in which a pulse is generated whenever a projection of pulse generating wheel 59 passes the core of magnetic head 60.

Figures 4, 4A:
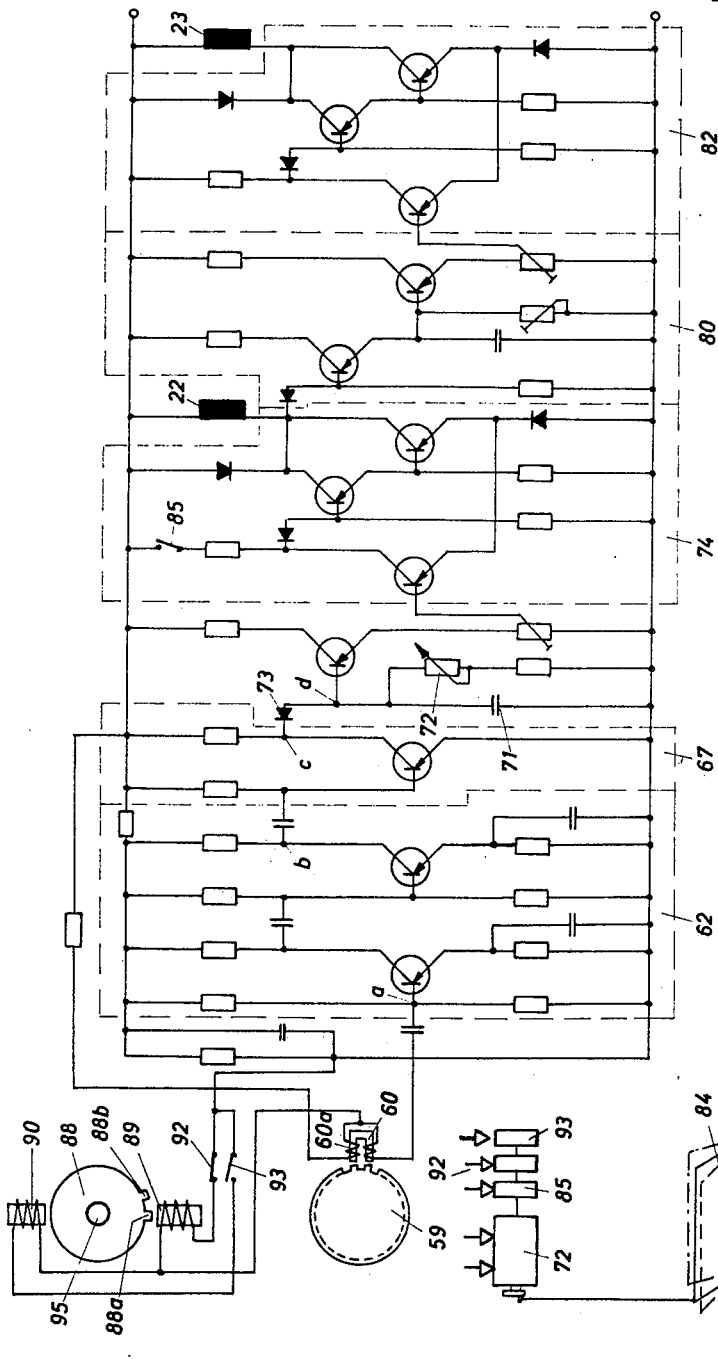
FIG. 4 is a circuit diagram illustrating a control circuit for the embodiment of FIG. 1.
FIG. 4a is a fragmentary schematic view illustrating operator controlled means for the control circuit of FIG. 4.

As shown in FIG. 4, winding 60a is connected by a condenser to the input $a$ of a pair of transistor amplifiers 62 so that at input $a$, pulses 64 having the shape shown in FIG. 5a are supplied to amplifiers 62 which are designed so that the two transistors are driven into saturation so that at the output $b$ of amplifiers 62, a corresponding sequence of pulses 65 appears which have the rectangular shape shown in FIG. 5b. The duration and frequency of pulses 64, 65 are a function of the momentary rotary speed of output shaft 6.

The rectangular pulses are supplied from output $b$ to a monostable multivibrator 67 which transforms the pulses 65 into pulses 69 which have substantially equal duration but an amplitude increasing with the increased frequency of the pulses.

Pulses 69 are supplied at point $c$ through a diode 73 to a capacitor 71 which is connected in parallel with a variable discharge resistors 72. In the intervals between the pulses, capacitor 71 discharges through variable resitor 72.

Diode 73 is connected to the input $d$ of a Schmitt trigger 74 to which a series of pulses 74 having the shape shown in FIG. 5d is supplied.

The Schmitt trigger 74 has the property to switch whenever its input signal exceeds a predetermined threshold value, and to return to its initial position when the amplitude of the input signal drops below this threshold value. The threshold value of the Schmitt trigger 74 is schematically indicated in FIG. 5d by the straight line 76. A series of pulses 78 having the shape shown in FIG. 5a is produced at the output of Schmitt trigger 74 and are supplied to the winding 22 described with reference to FIG. 1.

A second Schmitt trigger 82 is connected over a separating amplifier 80 with the first Schmitt trigger 74 in a cascade circuit, and produces pulses having the shape shown in FIG. 5e which are supplied to the second winding 23.

The circuit of the Schmitt triggers 74, 82 is designed so that the same alternate whereby either coupling winding 22 or brake winding 23 is energized.

If the variable resistor 72 is set to a small resistance, as shown in the left part of FIG. 5d, a great part of the charge of capacitor 71 discharges in the interval between the successive pulses, and pulses 75 exceeds the thrashold value 76 only during a comparatively small part of the entire time so that the frequency of the pulse sequence 78 is small. The percentage of time during which coupling winding 22 is energized, is short, while the brake winding 23 is energized for a correspondingly longer time. As a result, the time during which output shaft 6 is driven by motor shaft 1 is shorter than the time during which the output shaft 6 is braked, and the average speed of output shaft 6 is low, corresponding to a desired low rotary speed selected by adjustment of the variable resistor 72.

If the resistance of variable resistor 72 is increased, the charging voltage of capacitor 71 exceeds for a longer time the threshold value 76, so that the frequency of the pulse sequence 78 becomes higher, as shown on the right sides of FIGS. 5d and 5e. Within the rapid alternating between energizations of the coupling winding and brake winding, the time of energization of the coupling winding 22 is relatively greater, and the time of energization of the brake winding 23 is relatively shorter, and the rotary speed of output shaft 6 varies within narrow limits to exceed or drop below the desired high rotary speed which was selected by setting the variable resistor 72. Consequently, the rotary speed of output shaft 6 can be determined by adjustment of the variable resistor 72, which may be accomplished by operating a foot pedal 84, as schematically shown in FIG. 4a. Operation of foot pedal 84 will place resistor 72 in different angular positions in which different resistances are interposed between a pair of terminals.

The same foot pedal 84 is advantageously used for operating a switch 85 provided in Schmitt trigger 74, as shown in FIG. 4. Switch 85 is connected with the shaft of variable resistor or potentiometer 72 and has cams for operating switch contacts. In the position of rest of foot pedal 84, which may be determined by a return spring and a stop, switch 85 is opened so that coupling winding 22 is de-energized, and brake winding 23 is continuously energized whereby rotation of output shaft 6 is blocked in the normal inoperative position of the apparatus and corresponding position of rest of foot pedal 84.

It is desirable to stop the drive shaft of a machine which is driven from output shaft 6, in a predetermined angular position. As shown in FIG. 4, drive shaft 95 carries a control gear 88 located between two diametrically arranged magnetic heads 89 and 90 and having two peripheral teeth or projections 88a and 88b adjacent each other. Switches 92 and 93 are respectively connected in series with the windings of the magnetic heads 89 and 90, and are operated by foot pedal 84, as shown in FIG. 4a. By closing switch 92 or switch 93, the respective winding 89 or 90 is connected into the circuit. The other end of windings 89 and 90 are connected with magnetic head 60.

Assuming that switch 92 is closed and magnetic head 89 is connected into the circuit, the leading projection 88a produces, as soon as a sufficiently low rotary speed is obtained, a pulse in magnetic head 89 which causes a preliminary braking, whereupon the trailing tooth 88b produces a second pulse which causes braking of shaft 95 to a complete stop in a desired angular position. When switch 93 is closed, the magnetic head 90 becomes effective and cooperates with the projections 88a and 88b to stop the shaft in a position turned an angle of 180°.

It is evident that several magnetic heads may be provided spaced about control wheel 88, or that several control wheels 88 may be provided axially adjacent each other for stopping shaft 8 in a greater number of angular positions.

If control wheel 88 and magnetic heads 89 and 90 are to be provided in the embodiments of FIGS. 2 and 3, the final stopping of shaft 95 with shaft 6 is obtained by the auxiliary clutch and brake arrangement.

It will be understood that each of the elements described above, or two or more together, may also find a useful application in other types of arrangements for a motor differing from the types described above.

While the invention has been illustrated and described as embodied in a clutch and brake arrangement having annular windings surrounding axially movable coupling members and independently operating the same between coupling and braking positions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Clutch and brake arrangement comprising, in combination, supporting means; a motor shaft and an output shaft mounted on said supporting means for rotation about a common axis; a clutch member secured to said motor shaft; a brake member mounted on said supporting means, said clutch and brake members being disposed symmetrical to a plane of symmetry perpendicular to said axis and having peripheral annular magnetizable portions concentric with said axis; coupling means mounted between said clutch member and said brake member on said output shaft for rotation with the same and for axial movement along the same in opposite directions between a coupling position engaging said clutch member and a braking position engaging said brake member, said coupling means having a peripheral annular magnetizable portion concentric with said axis and having a diameter smaller than the diameter of said peripheral annular magnetizable portions of said clutch and brake members and forming with said members an annular space; and electromagnetic operating means located in said space and including an annular magnetizable carrier at least partly located between said clutch and brake members surrounding said coupling means, said operating means further including a pair of first and second annular windings having the same diameter, surrounding said coupling means and being disposed symmetrical to said plane of symmetry and located in the regions of said clutch member and of said brake member, respectively, said first and second windings being selectively energizable for generating opposite magnetic fluxes flowing through said carrier, said magnetizable portion of said coupling means, and said magnetizable portions of said clutch member and of said brake member, respectively, along symmetrical flux paths having the same length so that said coupling means is moved between said coupling and brake positions, whereby said output shaft is selectively driven or braked.

2. Clutch and brake arrangement as claimed in claim 1 wherein said coupling means includes first and second coupling members having peripheral magnetizable portions, and being mounted on said output shaft for rotation with the same and for independent axial movement to and from said coupling position, and to and from said braking position, respectively; and wherein the flux generated by said first winding flows through said peripheral magnetizable portion of said first coupling member, and the flux generated by said second winding flows through said peripheral magnetizable portion of said second coupling member for actuating the same.

3. Clutch and brake arrangement as claimed in claim 2 wherein said first and second magnetizable coupling members include first and second linings having friction surfaces cooperating with surfaces of said clutch member and of said brake member in parallel planes perpendicular to said axis; and wherein said first and second coupling members have magnetizable portions having faces located in said parallel planes and being flush with said first and second linings so that no air gaps are formed between said coupling members and said clutch member and brake member.

4. Clutch and brake arrangement as claimed in claim 1 wherein said brake member is mounted on said support means for rotation; and including auxiliary drive means for driving and rotating said brake member at a rotary speed lower than the rotary speed of said motor shaft and of said clutch member.

5. Clutch and brake arrangement as claimed in claim 1 wherein said brake member is mounted on said supporting means for rotation about said axis; and including auxiliary transmission means for connecting said motor shaft with said brake member for rotating the same at a lower speed than the rotary speed of said motor shaft, said transmission means including an auxiliary coupling means operable for connecting and disconnecting said motor shaft and brake member.

6. Clutch and brake arrangement as claimed in claim 5 wherein said transmission means includes an auxiliary brake.

7. Clutch and brake arrangement as claimed in claim 1 wherein said first and second windings include a coupling winding and a brake winding respectively surrounding said coupling means and being selectively energizable for moving said coupling means to said coupling position and said braking position, respectively, and circuit means connected with said coupling winding and brake winding and including control means settable to a predetermined rotary speed of said output shaft and controlling the energization of said coupling winding and brake winding so that said output shaft is driven and braked in such a sequence as to rotate substantially at said predetermined speed selected by setting said control means.

8. Clutch and brake arrangement as claimed in claim 7 comprising a drive shaft driven from said output shaft; and wherein said circuit comprises a position indicator secured to said drive shaft for rotation therewith and including means for generating a stop pulse for causing energization of said brake winding so that said drive shaft is stopped with said output shaft in a predetermined angular position.

9. Clutch and brake arrangement as claimed in claim 1 wherein said circuit means includes a pulse generator driven by said output shaft and producing a sequence of pulses whose frequency represents the actual rotary speed of said output shaft; wherein said control means compares said pulses with a constant signal value representing said predetermined selected speed so that said circuit means causes energization of said coupling winding and energization of said brake winding when said actual speed of said output shaft drops below, or exceeds said predetermined selected speed.

10. Clutch and brake arrangement comprising, in combination, supporting means; a motor shaft and an output shaft mounted on said supporting means for rotation about a common axis; a clutch member secured to said motor shaft; a brake member mounted on said supporting means, said clutch and brake members being disposed symmetrical to a plane of symmetry perpendicular to said axis and having peripheral annular magnetizable portions with outer cylindrical surfaces concentric with said axis; coupling means mounted between said clutch member and said brake member on said output shaft for rotation with the same and for axial movement along the same in opposite directions between a coupling position engaging said clutch member and a braking position engaging said brake member, said coupling means having a peripheral magnetizable portion with an outer cylindrical surface concentric with said axis and having a diameter smaller than the diameter of said outer cylindrical surfaces of said clutch and brake members and forming with said members an annular space; and electromagnetic operating means located in said space, and including an annular magnetizable carrier at least partly located between said clutch and brake members surrounding said coupling means, and having inner cylindrical surfaces surrounding said outer cylindrical surfaces of said clutch member, brake member, and coupling means, said operating means further including a pair of first and second annular windings having the same diameter, surrounding said coupling means and being disposed symmetrical to said plane of symmetry and located in the regions of said clutch member and said brake member, respectively, said first and second windings being selectively energizable for generating opposite magnetic fluxes flowing through said carrier, said magnetizable portion of said coupling means, and said magnetizable portions of said clutch member and of said brake member, respectively, along symmetrical flux paths having the same length so that said coupling means is moved between said coupling and brake positions whereby said output shaft is selectively driven or braked.

11. Clutch and brake arrangement as claimed in claim 10 wherein the cylindrical surface of said carrier which surrounds said outer cylindrical surface of said brake member abuts the same.

12. Clutch and brake arrangement as claimed in claim 10 wherein the cylindrical surface of said carrier which surrounds said outer cylindrical surface of said brake member is spaced from the same in radial direction to form a cylindrical air gap; and comprising auxiliary means for rotating said brake member relative to said coupling means and said carrier.

13. Clutch and brake arrangement as claimed in claim 12, wherein said auxiliary means includes a transmission connecting said motor shaft with said brake member so that the latter rotates slower than the former.

14. Clutch and brake arrangement as claimed in claim 10 wherein said clutch member, said brake member, and said first and second coupling members consist of a magnetizable material.

15. Clutch and brake arrangement as claimed in claim 10 wherein said magnetizable coupling means includes first and second coupling members mounted on said output shaft for rotation with the same and for independent axial movement to and from said coupling position and to and from said braking position, respectively; and wherein said annular magnetizable carrier surrounds said first and second coupling members, and wherein the flux generated by said first winding flow through said carrier and said first coupling member, and the flux generated by said second winding flows through said carrier and said second coupling member for respectively actuating the same to move in axial direction to coupling and braking positions respectively in engagement with said clutch member and brake member, respectively.

16. Clutch and brake arrangement as claimed in claim 15 wherein said carrier has substantially the same axial length as both said coupling members.

17. Clutch and brake arrangement as claimed in claim 15 wherein said carrier has an outer circular peripheral portion, an inner circular peripheral portion, and a web portion between said inner and outer peripheral portions so that the cross section of said carrier is substantially I-shaped.

18. Clutch and brake arrangement as claimed in claim 17 wherein said outer peripheral portion of said carrier has a greater axial length than said inner peripheral portion of the same; and wherein the circular end portions of said outer peripheral portion surround said peripheral magnetizable portions of said clutch member and said brake member.

19. Clutch and brake arrangement as claimed in claim 10 wherein said supporting means include housing means; and wherein said magnetizable carrier is secured to said housing means.

20. Clutch and brake arrangement as claimed in claim 19 wherein said housing means include a motor housing and a detachable closure cap located on opposite sides of said carrier, and bolt means for clamping said carrier between said motor housing and said cap; and wherein said carrier has cooling fins projecting between said motor housing and said cap.

21. Clutch and brake arrangement as claimed in claim 10 and comprising an auxiliary clutch and brake arrangement including a rotary auxiliary clutch member, a stationary auxiliary brake member, and an auxiliary coupling means movable between a coupling position engaging said auxiliary clutch member and a braking position engaging said auxiliary brake member; a first transmission connecting said motor shaft with said auxiliary clutch member; and a second transmission connecting said auxiliary coupling means with said brake member.

22. Clutch and brake arrangement as claimed in claim 21 wherein said first transmission includes pulleys secured to said clutch member and to said auxiliary clutch member, respectively, and a belt connecting said pulleys; and wherein said second transmission includes an auxiliary shaft connected with said auxiliary coupling means for rotation, and pulleys respectively secured to said brake member and to said auxiliary shaft, and belt means connecting said last-mentioned pulleys.

23. Clutch and brake arrangement as claimed in claim 22 wherein said pulleys which are connected with said clutch member and with said brake member, respectively, for rotation, are integral parts of the same.

24. Clutch and brake arrangement as claimed in claim 21 wherein said supporting means include housing means having a sleeve portion surrounding said output shaft; and comprising bearing means for mounting said brake member on said sleeve portion.

References Cited

UNITED STATES PATENTS 2,514,385    7/1950    Garbarini et al. _____ 192—48.2
2,659,830    11/1953    Mason et al. _____ 192—18.2 X (Other references on following page)

| | | | |
|---|---|---|---|
| 2,801,720 | 7/1957 | Bachman | 192—48.2 |
| 2,848,085 | 8/1958 | Mannaioni. | |
| 3,254,746 | 6/1966 | Myers | 192—18.2 |
| 3,272,290 | 9/1966 | Goddard | 192—18.2 |
| 3,322,249 | 5/1967 | Klinkenberg et al. | 192—18.2 |

BENJAMIN W. WYCHE III, Primary Examiner

U.S. Cl. X.R.

192—9, 48.2, 84, 104